United States Patent
Bhattacharjee et al.

(10) Patent No.: US 8,903,341 B2
(45) Date of Patent: Dec. 2, 2014

(54) SUCCESSIVE INTERFERENCE CANCELLATION (SIC) ORDERING ALGORITHMS FOR IMPROVED MULTIPLE-INPUT MULTIPLE-OUTPUT (MIMO) PERFORMANCE

(71) Applicant: QUALCOMM Incorporated, San Diego, CA (US)

(72) Inventors: Supratik Bhattacharjee, San Diego, CA (US); Brian Clarke Banister, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/705,878

(22) Filed: Dec. 5, 2012

(65) Prior Publication Data

US 2014/0155010 A1 Jun. 5, 2014

(51) Int. Cl.
 H04B 17/00 (2006.01)
 H04B 1/10 (2006.01)
 H04L 25/03 (2006.01)
 H04J 11/00 (2006.01)

(52) U.S. Cl.
 CPC ........ *H04B 1/1027* (2013.01); *H04L 25/03891* (2013.01); *H04J 11/0043* (2013.01); *H04L 2025/03426* (2013.01)
 USPC ......... 455/226.3; 455/135; 455/296; 455/334

(58) Field of Classification Search
 USPC ........... 455/132–135, 226.1–226.3, 296, 323, 455/334
 See application file for complete search history.

(56) References Cited

U.S. PATENT DOCUMENTS

| 8,184,750 | B2 | 5/2012 | Mundarath et al. |
| 2006/0205357 | A1 | 9/2006 | Kim |
| 2009/0327835 | A1 | 12/2009 | Oteri et al. |
| 2011/0013684 | A1 | 1/2011 | Semenov et al. |
| 2011/0051865 | A1 | 3/2011 | Mergen et al. |

(Continued)

FOREIGN PATENT DOCUMENTS

EP 2234360 A1 9/2010

OTHER PUBLICATIONS

Hunukumbure M., et al., "On sub-stream ordering for OSIC detection in 4G distributed MIMO schemes", Oct. 15, 2012, Communications (APCC), 2012 18th Asia-Pacific Conference on, IEEE, pp. 261-265, XP032278696, ISBN: 978-1-4673-4726-6 p. 263-p. 264.

(Continued)

*Primary Examiner* — Nhan Le
(74) *Attorney, Agent, or Firm* — Patterson & Sheridan, L.L.P.

(57) ABSTRACT

Certain aspects of the present disclosure provide ordering techniques for a Successive Interference Cancellation (SIC) receiver which may be used to robustly choose a correct stream for first decode under varying data rates, SNR and mobile propagation conditions in Multiple Input Multiple Output (MIMO) systems. The SIC ordering techniques discussed in the disclosure include SNR and/or Rate based information theoretic approach. For example, the SIC receiver may evaluate an SNR based or RATE-based information theoretic metric for the MIMO streams and choose one stream with a higher value of the metric for decoding first. A speculative single code block based approach is may also be used for selecting a stream for first decode, by leveraging the presence of per code block Cyclic Redundancy Check (CRC) and the lack of time diversity in LTE systems.

12 Claims, 9 Drawing Sheets

(56) References Cited

U.S. PATENT DOCUMENTS

| | | |
|---|---|---|
| 2011/0080975 A1 | 4/2011 | Toda et al. |
| 2011/0122760 A1 | 5/2011 | Kwon et al. |
| 2011/0274059 A1* | 11/2011 | Brown et al. ............. 370/329 |
| 2012/0044982 A1 | 2/2012 | Sampath et al. |
| 2012/0269143 A1 | 10/2012 | Bertrand et al. |
| 2013/0198591 A1* | 8/2013 | Kamuf et al. ............. 714/780 |

OTHER PUBLICATIONS

International Search Report and Written Opinion—PCT/US2013/072989—ISA/EPO—Apr. 3, 2014.

* cited by examiner

SUCCESSIVE INTERFERENCE CANCELLATION (SIC) ORDERING ALGORITHMS FOR IMPROVED MULTIPLE-INPUT MULTIPLE-OUTPUT (MIMO) PERFORMANCE

BACKGROUND

1. Field

The present disclosure relates generally to wireless communication systems, and more particularly, to Successive Interference Cancellation (SIC) ordering algorithms for improved Multiple-Input Multiple-Output performance.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Certain aspects of the present disclosure provide a method for wireless communications by a receiver. The method generally includes receiving at least two streams of data, selecting at least one of the received streams to decode first, from comparison of a metric corresponding to at least two of the streams, the metric based on a gap between measured value of a parameter and allocated value of the parameter, and performing interference cancelation using results of decoding the selected at least one stream to decode at least one non-selected stream.

Certain aspects of the present disclosure provide a method for wireless communications. The method generally includes receiving at least first and second streams of data, attempting to decode at least a first code block of the first stream, and if the first code block of the first stream decodes successfully, selecting the first stream to decode first and performing interference cancelation using results of decoding the first stream to decode the second stream.

Certain aspects of the present disclosure provide an apparatus for wireless communications. The apparatus generally includes means for receiving at least two streams of data, means for selecting at least one of the received streams to decode first, from comparison of a metric corresponding to at least two of the streams, the metric based on a gap between measured value of a parameter and allocated value of the parameter, and means for performing interference cancelation using results of decoding the selected at least one stream to decode at least one non-selected stream.

Certain aspects of the present disclosure provide an apparatus for wireless communications. The apparatus generally includes at least one processor and a memory coupled to the at least one processor. The at least one processor is generally configured to receive at least two streams of data, select at least one of the received streams to decode first, from comparison of a metric corresponding to at least two of the streams, the metric based on a gap between measured value of a parameter and allocated value of the parameter, and perform interference cancelation using results of decoding the selected at least one stream to decode at least one non-selected stream.

Certain aspects of the present disclosure provide a computer program product for wireless communications. The computer program product generally includes a computer-readable medium comprising instructions for receiving at least two streams of data, selecting at least one of the received streams to decode first, from comparison of a metric corresponding to at least two of the streams, the metric based on a gap between measured value of a parameter and allocated value of the parameter, and performing interference cancelation using results of decoding the selected at least one stream to decode at least one non-selected stream.

Certain aspects of the present disclosure provide an apparatus for wireless communications. The apparatus generally includes means for receiving at least first and second streams of data, means for attempting to decode at least a first code block of the first stream, and means for selecting the first stream to decode first and performing interference cancelation using results of decoding the first stream to decode the second stream, if the first code block of the first stream decodes successfully.

Certain aspects of the present disclosure provide an apparatus for wireless communications. The apparatus generally includes at least one processor and a memory coupled to the at least one processor. The at least one processor is generally configured to receive at least first and second streams of data, attempt to decode at least a first code block of the first stream, and select the first stream to decode first and performing interference cancelation using results of decoding the first stream to decode the second stream, if the first code block of the first stream decodes successfully Certain aspects of the present disclosure provide a computer program product for wireless communications. The computer program product generally includes a computer-readable medium comprising instructions for receiving at least first and second streams of data, attempting to decode at least a first code block of the first stream, and if the first code block of the first stream decodes successfully, selecting the first stream to decode first and performing interference cancelation using results of decoding the first stream to decode the second stream.

DETAILED DESCRIPTION

Figure 1:
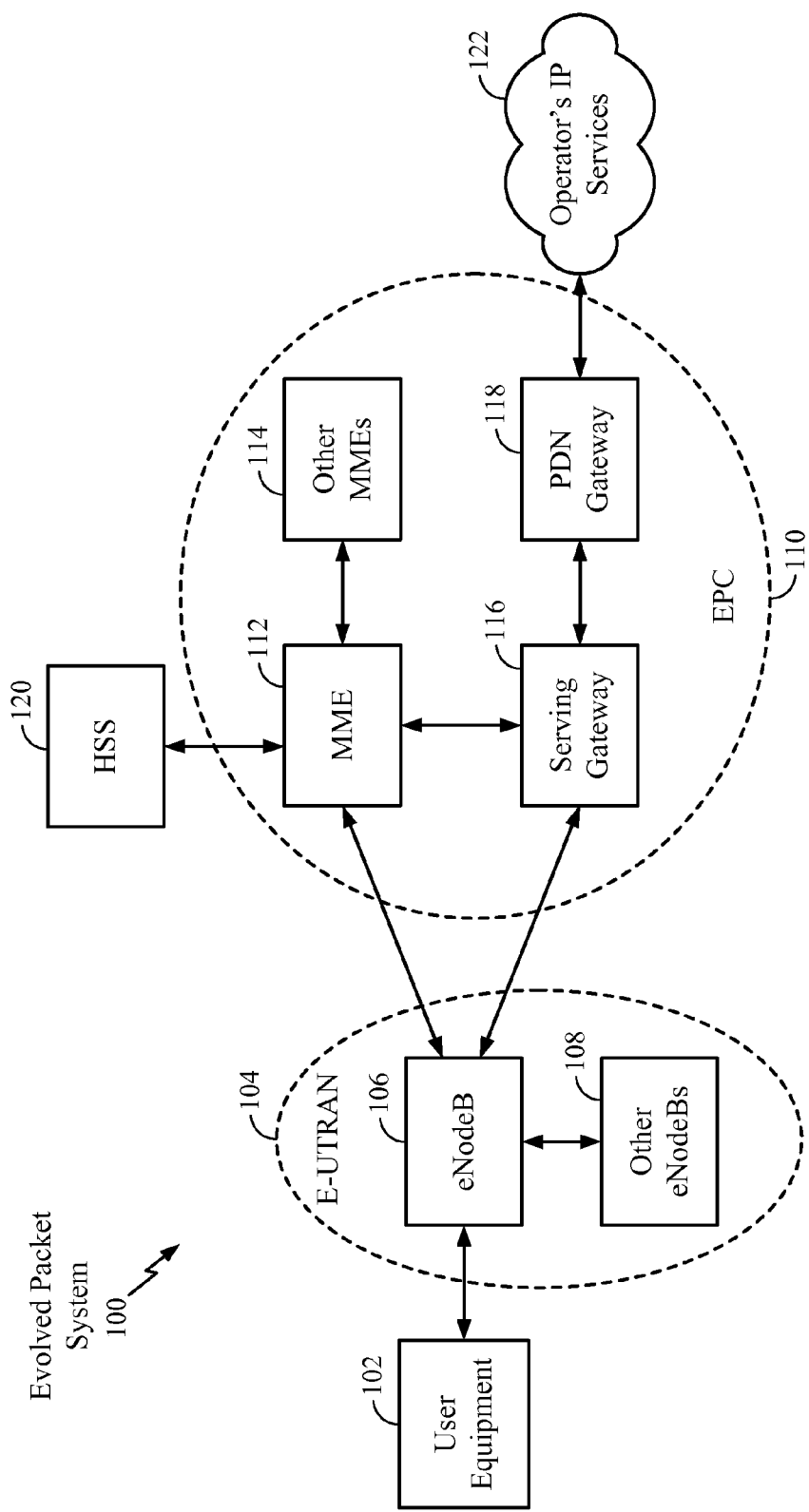
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software/firmware, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software/firmware, middleware, microcode, hardware description language, or otherwise.

Accordingly, in one or more exemplary embodiments, the functions described may be implemented in hardware, software/firmware, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. Exemplary other access networks may include an IP Multimedia Subsystem (IMS) PDN, Internet PDN, Administrative PDN (e.g., Provisioning PDN), carrier-specific PDN, operator-specific PDN, and/or GPS PDN. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a netbook, a smart book, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include, for example, the Internet, the Intranet, an IP Multimedia Subsystem (IMS), and a PS Streaming Service (PSS). In this manner, the UE 102 may be coupled to the PDN through the LTE network.

Figure 2:
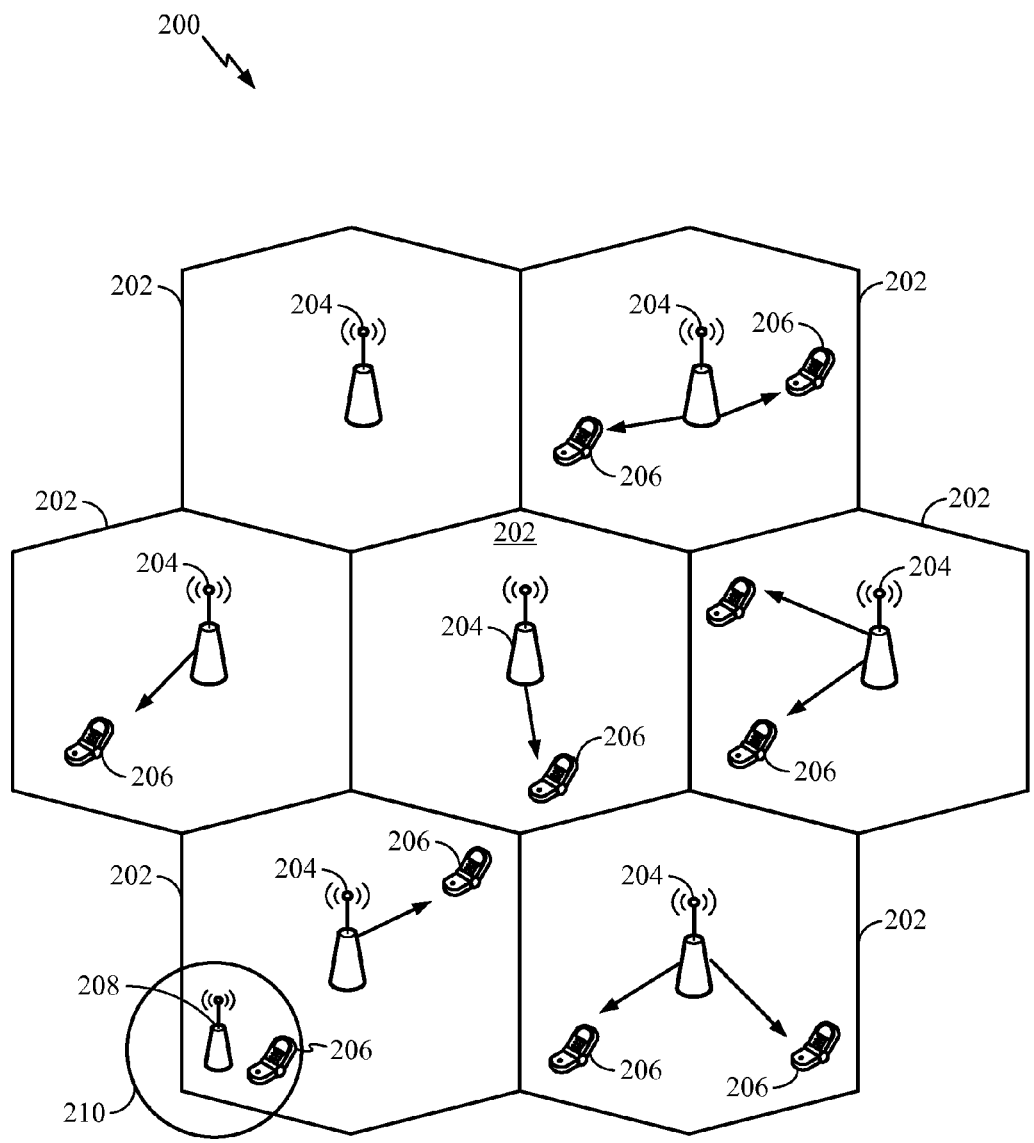
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
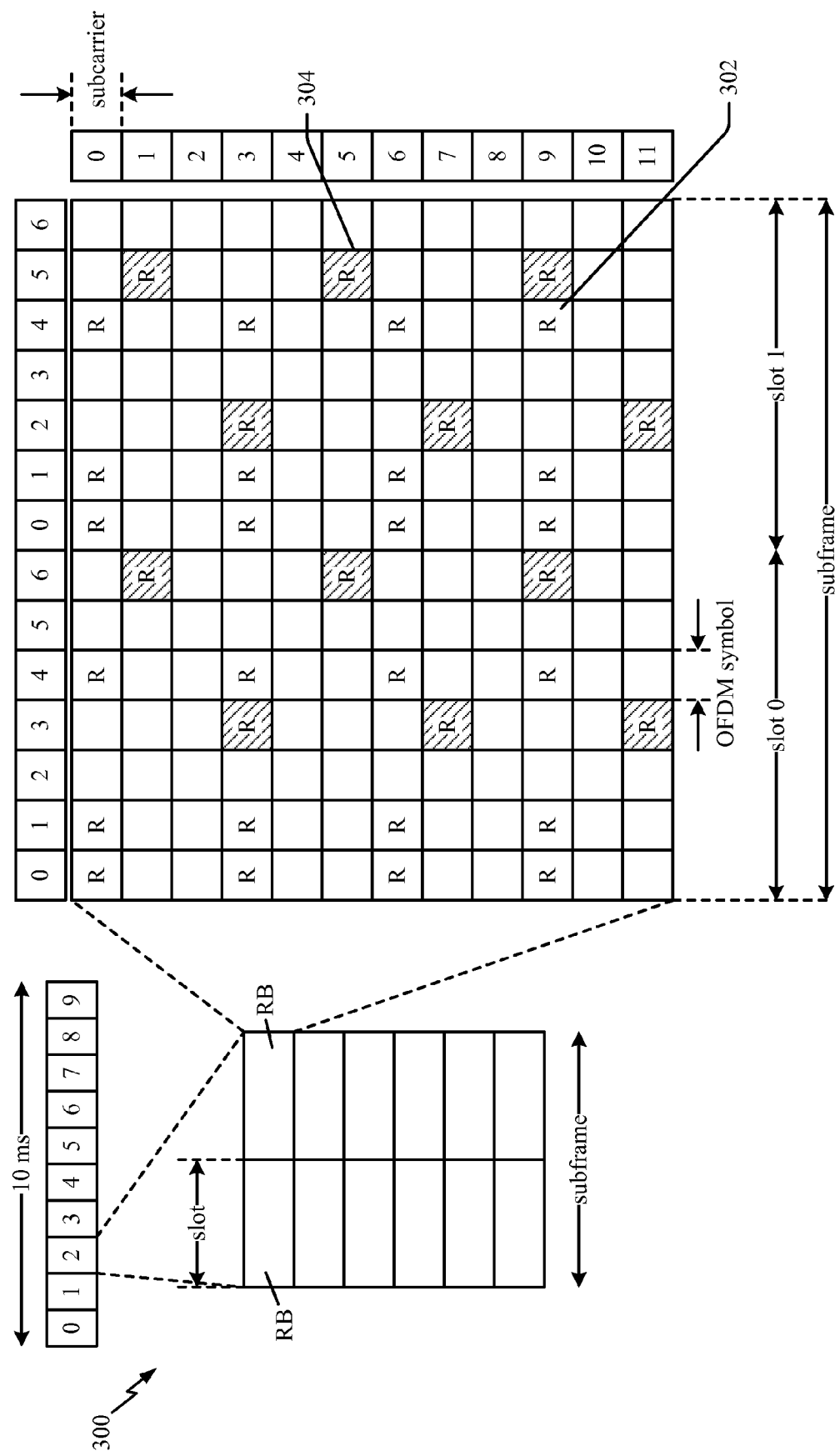
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
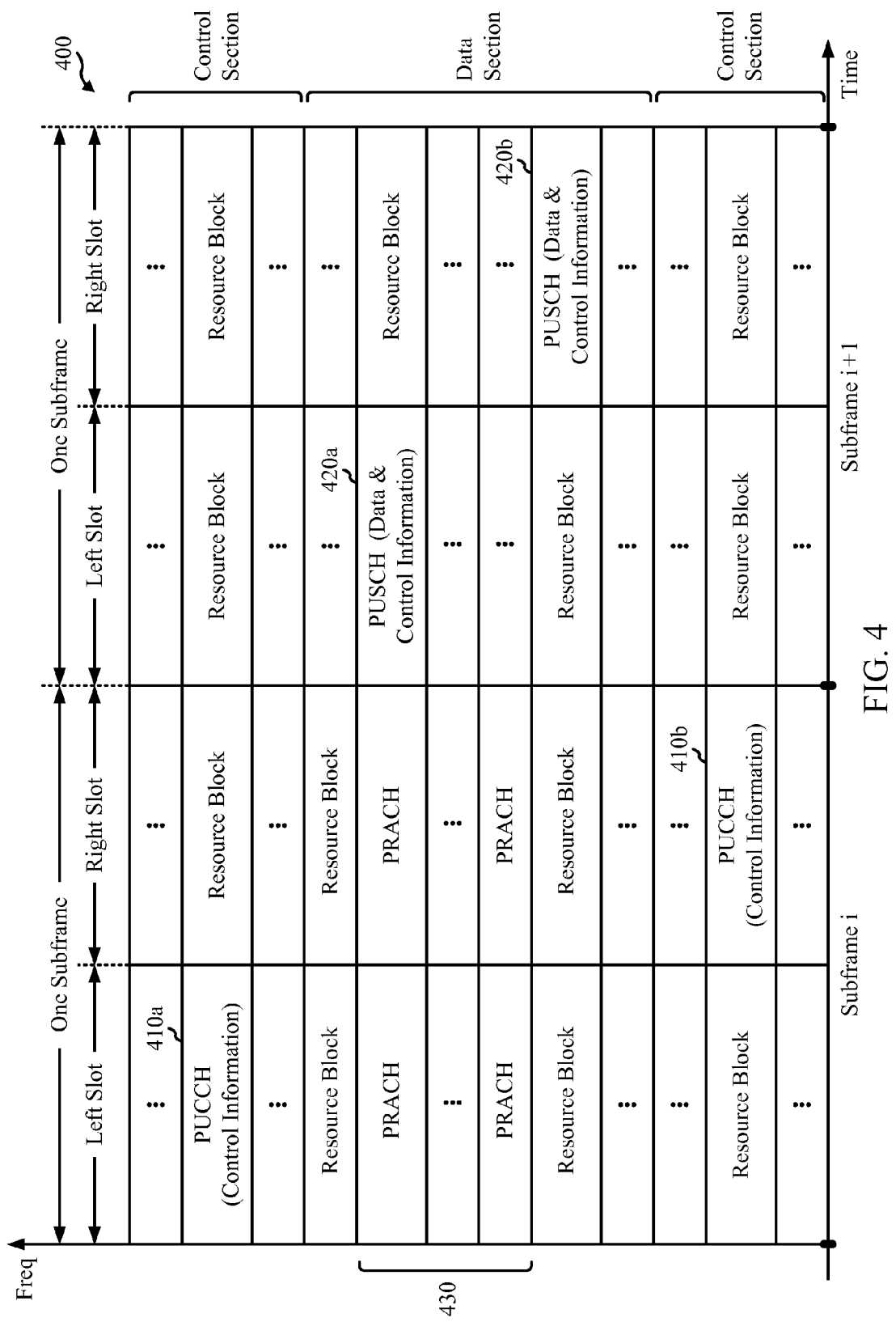
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
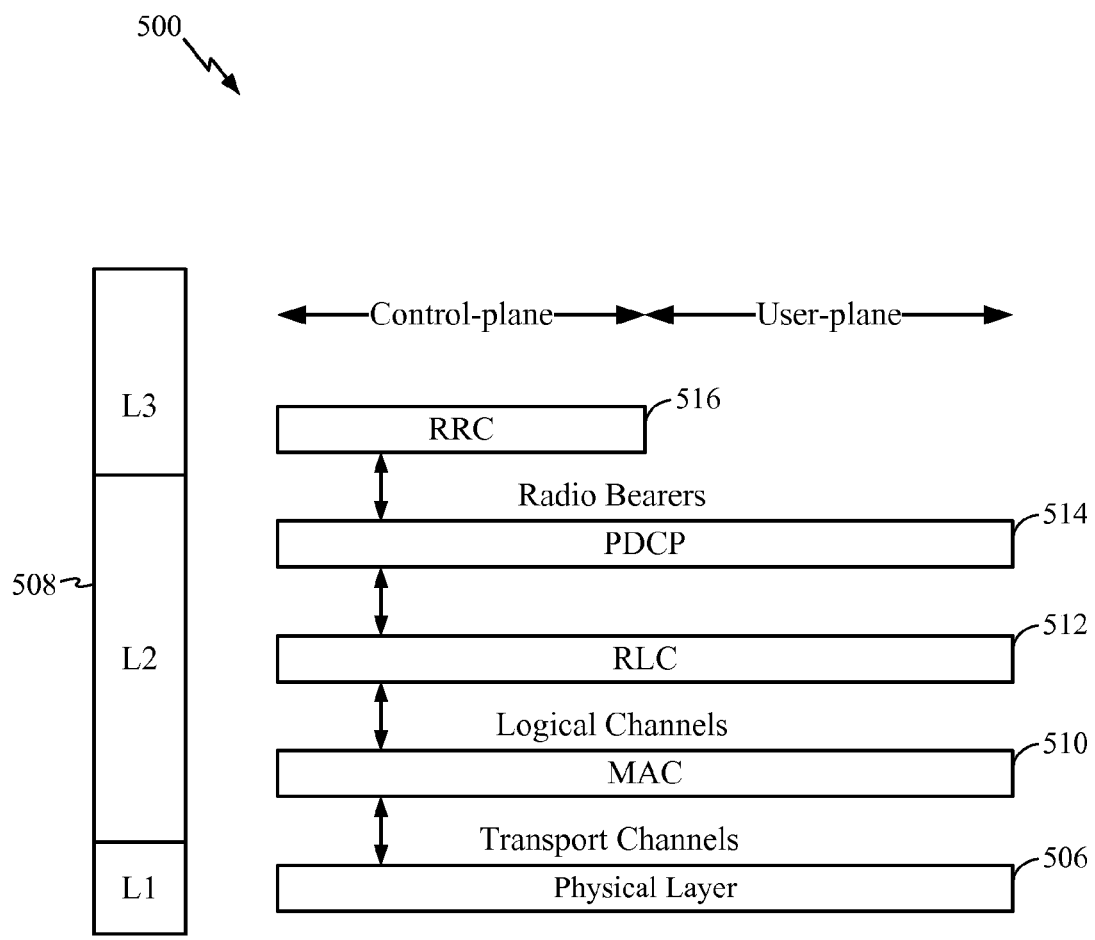
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
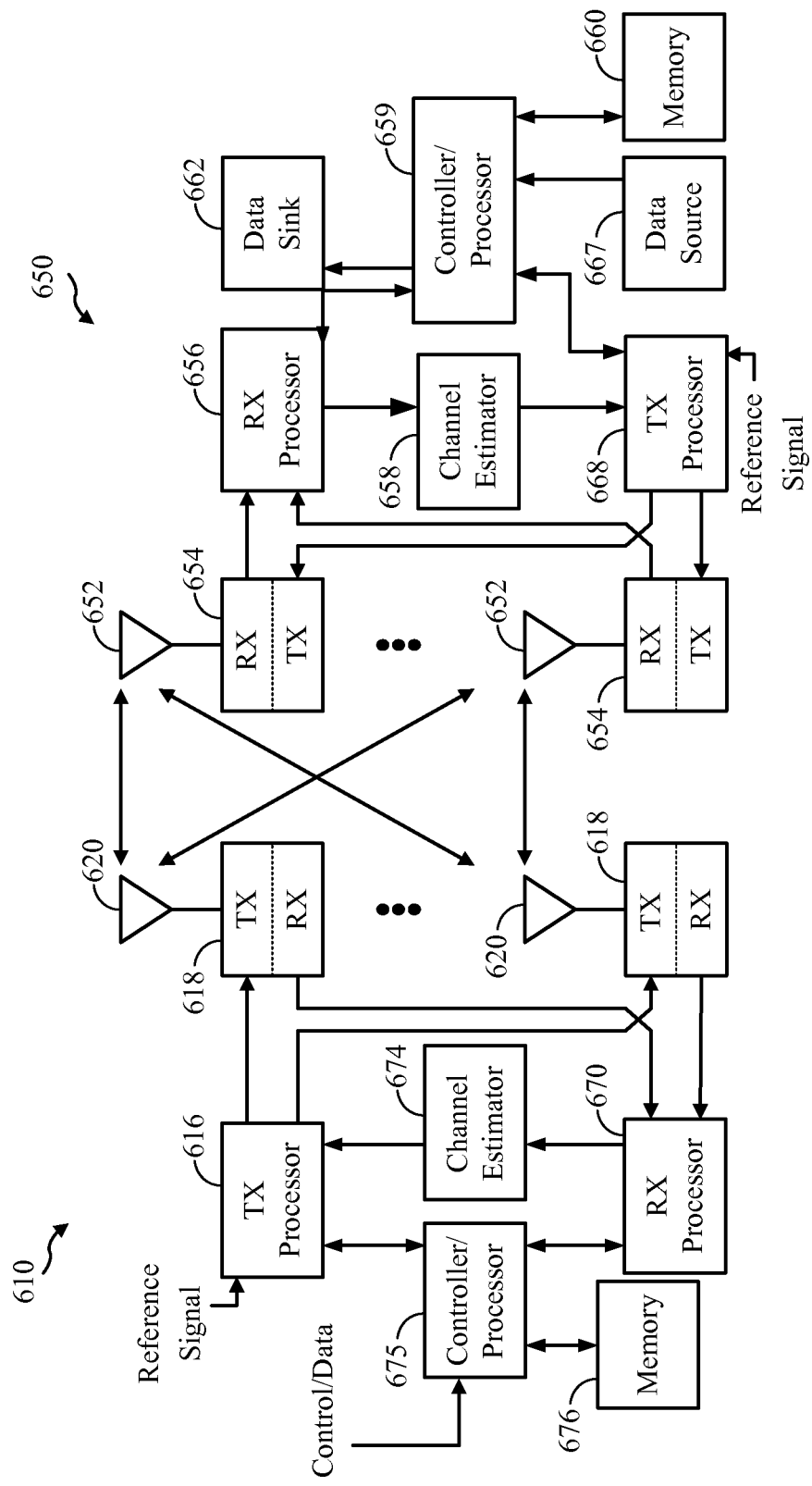
FIG. 6 is a diagram illustrating an example of an evolved Node B and user equipment in an access network, in accordance with certain aspects of the disclosure.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmissions of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Example Successive Interference Cancellation (Sic) Ordering Algorithms for Improved Multiple-Input Multiple-Output (MIMO) Performance MIMO transmissions may consist of two or more streams/layers of data carrying independent information which is spatially multiplexed and sent over the air. In certain aspects, Minimum Mean-Square Error (MMSE) based SIC receiver is commonly used for MIMO decoding. The SIC receiver generally aims at exploiting the varying Signal to Noise Ratios (SNRs) and/or rates (e.g., data rates) on the MIMO streams by attempting to decode a first stream with higher chance of successful decode, followed by cancellation of that stream from the input signal and then attempting to decode the remaining stream(s). For example, for a 2×2 MIMO system consisting of first and second streams, the SIC receiver may decode a first stream and iteratively cancel out the first stream from the input signal to improve decoding of the second stream.

The success of the SIC receiver typically depends on selecting a right stream (e.g., with the higher chance of successful decode) to decode first. In certain aspects, the most straightforward way to decode the streams is to randomly select a first stream for decoding. However, if the first decode is unsuccessful, the SIC receiver may have to decode the second stream, cancel the second stream from the input signal, and then decode the first stream again. This will require three decodes. In certain aspects, the receiver may not have enough resources (e.g., processing power, maximum configured number of decodes, time constraints etc.) to carry out three decodes. Thus, if the receiver chooses a wrong stream for first decode and fails to decode the chosen stream, both streams may not be decoded. Accordingly, correct selection of a stream for first decode may be essential to efficient and successful SIC receiver processing.

Certain aspects of the present disclosure discuss techniques for robustly choosing a correct stream for first decode under varying data rates, SNR and mobile propagation conditions. The SIC ordering algorithms discussed in the present disclosure include SNR and/or Rate based information theoretic approach. For example, the SIC receiver may evaluate an SNR based or RATE-based information theoretic metric for the MIMO streams and choose one stream with a higher value of the metric for decoding first. In certain aspects, a speculative single code block based approach may be used for selecting a stream for first decode, by leveraging the presence of per code block Cyclic Redundancy Check (CRC) and the lack of time diversity in LTE systems.

Certain aspects of the present disclosure are discussed with respect to an example 2×2 MIMO scenario. However, the scenario is used only for illustrative purposes and ease of explanation, and it may be appreciated that the discussed approaches and algorithms may be generalized for any NXN MIMO system. In certain aspects, the terms stream and layer both refer to a stream of data, and are used interchangeably throughout the present disclosure.

Snr Gap-Based Metric Approach

In certain aspects, for a 2×2 MIMO system including two streams/layers of data, a receiver (e.g., SIC receiver) may select a stream to decode first based on a gap between the measured SNR and expected SNR for each stream in the received signal. In an aspect, an SNR gap-based metric $\Gamma_i^{SNR}$ may be determined for each of the streams using the measured SNR $\gamma^{meas}$ of the stream as received at the receiver and the expected SNR for the stream.

The average measured SNR $\gamma^{meas}$ measured over the last two sub-frames of a received layer is generally available to the receiver from Channel Quality Indicator (CQI) processing. For example, the CQI processing may be performed by channel estimator 658 of UE 650, and/or channel estimator 674 of eNB 610. The measured SNR $\gamma^{meas}$ and an allocated rate $R_i^{alloc}$ of an layer may be used to form an SNR margin metric $\Gamma_i^{SNR}$ as shown below:

$$\Gamma_i^{SNR} = \frac{\gamma_i^{meas}}{2^{R_i^{alloc}} - 1}$$

(Error! No text of specified style in document . . . 1)

In an aspect, the expression $2^{R_i^{alloc}} - 1$ denotes an expected SNR for the $i^{th}$ layer.

Once the SNR margin metric $\Gamma_i^{SNR}$ is determined for both layers, a layer k with the largest SNR margin metric $\Gamma_i^{SNR}$ may be chosen as the Stage 1 decode layer, by comparison of the metric corresponding to each layer, as follows:

$$k = \operatorname*{argmax}_i(\Gamma_i^{SNR})$$

(Error! No text of specified style in document . . . 2)

In an aspect, the larger the SNR based metric for a particular layer is, larger is the margin of error during decoding the layer, and higher is the chance of a successful decode.

In certain aspects, the above relationship may be modified if Hybrid Automatic Repeat Request (HARQ) is enabled and there are multiple transmissions (e.g., re-transmissions) of bits in a stream, since the actual rate and SNR may be different in these cases, and specifically, since the rate and SNR may change on each re-transmission. Further, a comparison of two code words (e.g., corresponding to two different streams) with different numbers of retransmissions may be required. Thus, there may be a need to determine the effective SNR and rate metric for HARQ.

In an aspect, an average (or effective) SNR for an $i^{th}$ layer across $P_i$ transmissions may be determined by summing SNRs $\gamma_i^{meas}$ for each transmission p and dividing the sum by $P_i$ transmissions, as follows:

$$\gamma_i^{meas} = \frac{\sum_{p=1}^{P_i} \gamma_i^{meas,p}}{P_i}$$

(Error! No text of specified style in document . . . 3)

In certain aspects, the rate allocated for each transmission or re-transmission may change, for example, due to a different set of bits received in each transmission. Thus, an average allocated rate for an $i^{th}$ layer across $P_i$ transmissions may be computed by summing the allocated rate $R_i^{alloc}$ for each transmission p and dividing the sum by $P_i$ transmissions, as follows:

$$R_i^{alloc} = \frac{\sum_{p=1}^{P_i} R_i^{alloc,p}}{P_i}$$

(Error! No text of specified style in document . . . 4)

The SNR gap-based metric $\Gamma_i^{SNR}$ for the $i^{th}$ layer across $P_i$ transmissions may be given as follows:

$$\Gamma_i^{SNR} = \frac{\gamma_i^{meas}}{2^{R_i^{alloc}} - 1}$$

As noted above, once the metric $\Gamma_i^{SNR}$ is determined for both layers, a layer k with the largest SNR margin metric $\Gamma_i^{SNR}$ may be chosen as the Stage 1 decode layer, by comparison of the metric corresponding to each layer, as follows:

$$k = \operatorname*{argmax}_i(\Gamma_i^{SNR})$$

In certain aspects, for a stream i, the information bits for each re-transmission may remain the same, but the number of symbols available to transmit may change. Thus, the average allocated rate for the $i^{th}$ layer across $P_i$ transmissions may be also be computed as follows:

$$R_i^{alloc} = \frac{TBSize}{\sum_{p=1}^{P_i} M_{i,symb}^p}$$

(Error! No text of specified style in document . . . 5)

where, $M_{i,symb}^p$ is the number of symbols for the $p^{th}$ transmission of the $i^{th}$ layer, and TB Size is the overall transport block size (e.g., length of information bits).

Rate Gap-Based Metric Approach

In certain aspects, for a 2×2 MIMO system including two streams/layers of data, the receiver (e.g., SIC receiver) may select a stream for first decode based on a gap between the supportable rate and allocated rate for each stream in the received signal. In an aspect, a RATE gap-based metric $\Gamma_i^{SNR}$ may be determined for each of the streams using supportable rate $R^{meas}$ of the stream as received at the receiver and allocated rate $R^{alloc}$ for the stream.

In an aspect, the average supportable rate $R^{meas}$ may generally be calculated based on the average measured SNR $\gamma_i^{meas}$ which as noted above, may be obtained from CQI processing, as follows:

$$R_i^{meas} = \sum_{p=1}^{P_i} \sum_{j=1}^{RB_p} \log(1 + \gamma_{i,j}^{meas,p}) \quad (2.1)$$

For equation (2.1), block fading channel over each resource block (RB) is assumed. As shown in the equation (2.1), for each transmission (or re-transmission) in the $i^{th}$ layer, the supportable rate over each allocated RB is calculated based on the measured SNR $\gamma_i^{meas}$ of that RB (e.g., using Shannon-Hartley theorem), and then added across all the RBs allocated in each transmission and across all $P_i$ transmissions.

The allocated rate $R_i^{alloc}$ for the $i^{th}$ layer may be obtained according to equations (1.4) and (1.5).

The rate margin metric $\Gamma_i^{rate}$ for the $i^{th}$ layer may then be determined using the supportable rate $R_i^{meas}$ and the allocated $R_i^{alloc}$ for the layer, as follows:

$$\Gamma_i^{rate} = \frac{R_i^{meas}}{R_i^{alloc}} \quad (2.2)$$

The rate metrics $\Gamma_i^{rate}$ each layer may be compared and a layer k with the largest rate metric may be chosen as the Stage 1 decode layer as follows:

$$k = \underset{i}{\mathrm{argmax}}(\Gamma_i^{rate}) \quad (2.3)$$

In certain aspects, the rate gap-based metric approach may be more robust as compared to the SNR gap-based metric since the summation of the rates is done in the log domain as compared to the linear domain.

In certain aspects, although the SNR gap-based metric and the Rate gap-based metric schemes are discussed with respect to a 2×2 MIMO system consisting of two layers, the algorithms may be used for any N×N MIMO system. In an aspect, for a MIMO system having N streams, an iterative approach may be used, where, for each iteration, the schemes may be utilized to select and cancel one stream most likely to be decoded successfully, until all streams are decoded. In an alternative aspect, the schemes may be utilized to select more than one stream for each iteration, e.g., select K streams most likely to be successfully decoded based on the gap-based metrics, and then cancel the K streams from the input signal to decode other streams.

Speculative Single Code Block Based Ordering

In certain aspects, for a conventional receiver with no timeline limitations, (TD throughput) the best way to decode the MIMO streams is to randomly decode a first stream, cancel the decoded stream from the input signal and decode the second stream. If the, first decode fails, the receiver may decode the second stream, cancel it from the input signal and decode the first stream again.

In certain aspects, for receivers with timeline limitations, the SNR gap-based metric and the Rate gap-based metric schemes may be used, that are aimed at making an intelligent decision about which stream has the highest likelihood of being decoded correctly in the presence of the other stream and choosing that as the first decoded stream. Under these schemes we only need to budget for 2 sets of decodes, one set per stream. The main advantage of these schemes is reduced timeline (TD throughput) requirement. However, it comes at an expense of possible estimation errors in choosing the first decoded stream(s).

The speculative code block based ordering approach aims at striking a balance between the time required and SIC ordering robustness.

In an aspect, each LTE subframe comprises code blocks. Assuming each subframe includes N code blocks, a conventional receiver, as noted above, my require up to 3N decodes and would be most robust since no estimation is involved. On the other hand, receiver utilizing the SNR gap-based metric and the Rate gap-based metric schemes, as noted above may require only 2N decodes, but with potential estimation errors.

The speculative single code block based ordering approach leverages lack of time diversity within LTE subframes (e.g., <1 ms). The LTE subframes are typically of 1 ms duration. Generally, the channel does not change significantly during this small period of time and thus, if the channel is bad for one code block, there is high probability that the channel is bad for all code blocks of the subframe. Similarly, if the channel is good for a code block, there is high probability that the channel is good for all code blocks of the subframe. Thus, if one code block does not decode correctly, it may be safely assumed that all other code blocks may not decode correctly.

Under the speculative single code block based ordering approach, the receiver chooses any one of the streams (e.g., randomly or based on information theoretic based metric discussed above) and attempts to decode at least the first code block. If the code block passes CRC, the receiver proceeds to decode that stream as the first attempted stream. However, if the decode of the stream fails the CRC, the receiver stops any further processing of that stream and chooses the other stream as the first attempted stream.

Thus, in a worst case scenario (when the first code block fails CRC), the receiver may have to perform 2N+1 decodes.

In certain aspects, this scheme essentially rules out any errors, as the streams are actually decoded and selected, instead of basing the selection on estimations (e.g., SNR estimation). This improves the robustness of the ordering decisions while not significantly affecting the timeline.

In certain aspects, the receiver may adaptively switch between the above three approaches for making the ordering decisions.

Figure 7:
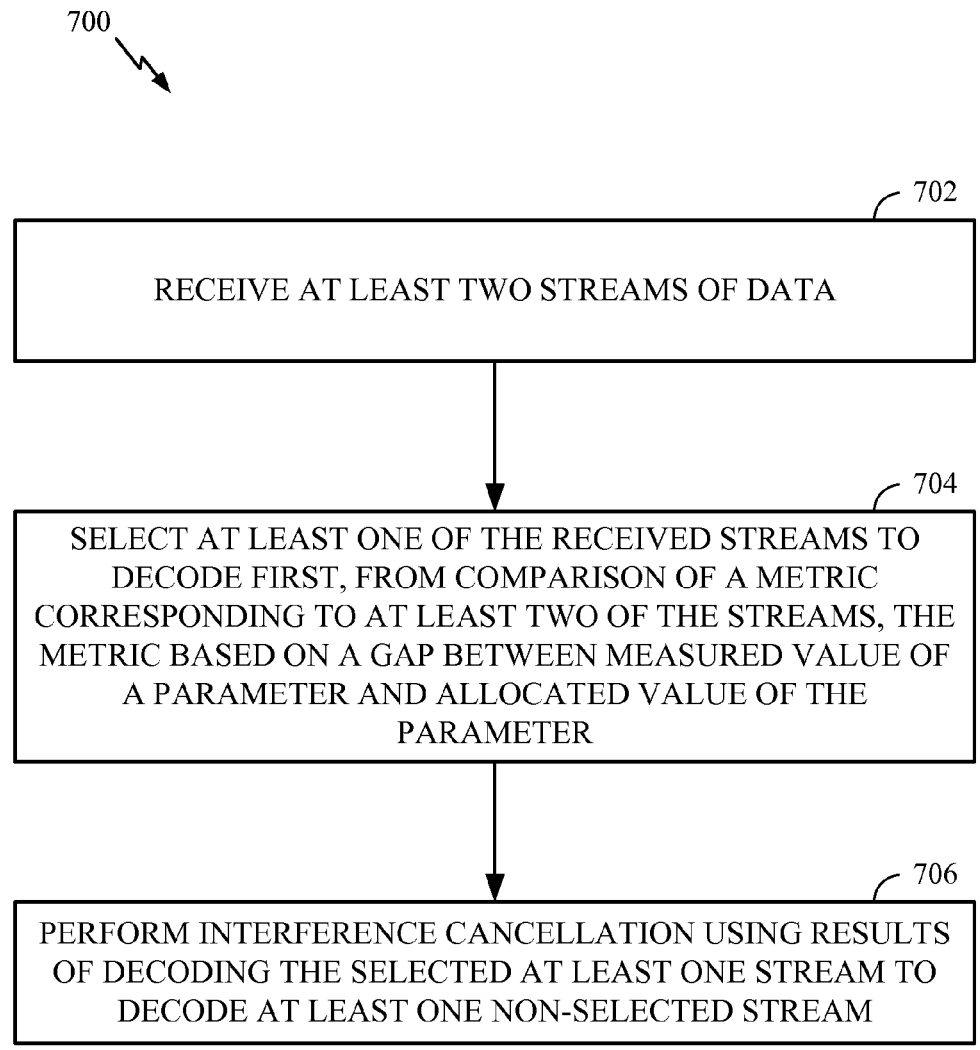
FIG. 7 illustrates a flow diagram showing operations that may be performed by a receiver for SIC ordering, in accordance with certain aspects of the present disclosure.

FIG. 7 illustrates a flow diagram showing operations 700 that may be performed by a receiver for SIC ordering, in accordance with certain aspects of the present disclosure. In an aspect the receiver may be include the UE 650 or the eNB 610. Further, to perform the operations 700, the receiver may employ one or more of the RX processor 656, 670, channel estimator 658, 674, and/or controller/processor 659, 674.

Operations 700 may begin, at 702, by receiving at least two streams of data. For example, the UE 650 may receive the at least two streams of data by antennas 652. Similarly eNB 610 may receive the at least two streams of data by antennas 620.

At 704, the receiver may select at least one of the received streams to decode first, from comparison of a metric corresponding to at least two of the streams, the metric based on a gap between measured value of a parameter and allocated value of the parameter. At 706, the receiver may perform interference cancellation using results of decoding the selected at least one stream to decode at least one non-selected stream. For example, the UE 650 may execute steps 704 and 706 by employing the RX processor 656, the controller 659, the channel estimator 658, or a combination thereof. Similarly, eNB 610 may execute steps 704 and 706 by employing the RX processor 670, the controller 675, the channel estimator 674, or a combination thereof.

Figure 8:
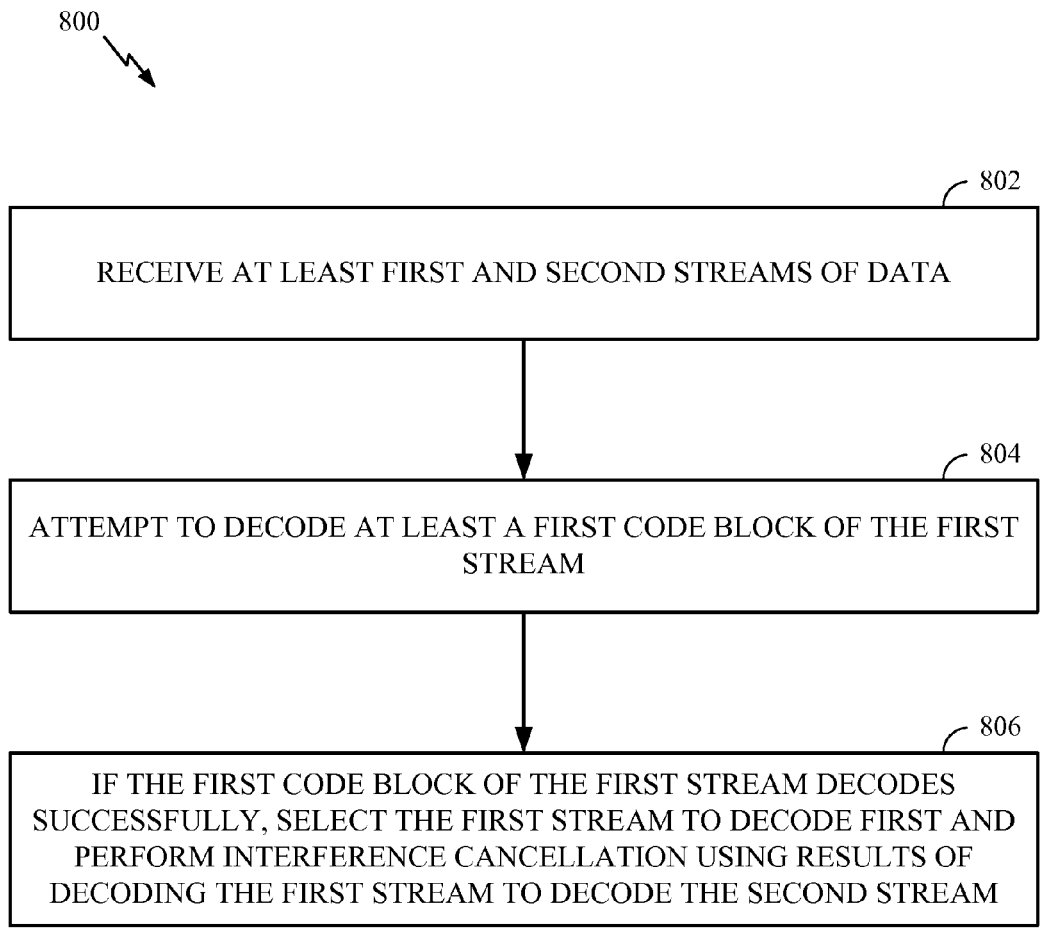
FIG. 8 illustrates a flow diagram showing operations that may be performed by a receiver for Speculative Single Code Block Based SIC ordering, in accordance with certain aspects of the present disclosure

FIG. 8 illustrates a flow diagram showing operations 800 that may be performed by a receiver for Speculative Single Code Block Based SIC ordering, in accordance with certain aspects of the present disclosure. In an aspect the receiver may be include the UE 650 or the eNB 610. Further, to perform the operations 800, the receiver may employ one or more of the RX processor 656, 670, channel estimator 658, 674, and/or controller/processor 659, 674.

Operations 800 may begin, at 802, by receiving at least first and second streams of data. For example, the UE 650 may receive the streams of data by antennas 652. Similarly eNB 610 may receive the streams of data by antennas 620. At 804, the receiver may attempt to decode at least a first code block of the first stream. At 806, if the first code block of the first stream decodes successfully, the receiver may select the first stream to decode first and perform interference cancelation using results of decoding the first stream to decode the second stream. For example, the UE 650 may execute steps 804 and 806 by employing the RX processor 656, the controller 659, the channel estimator 658, or a combination thereof. Similarly, eNB 610 may execute steps 804 and 806 by employing the RX processor 670, the controller 675, the channel estimator 674, or a combination thereof.

Figure 9:
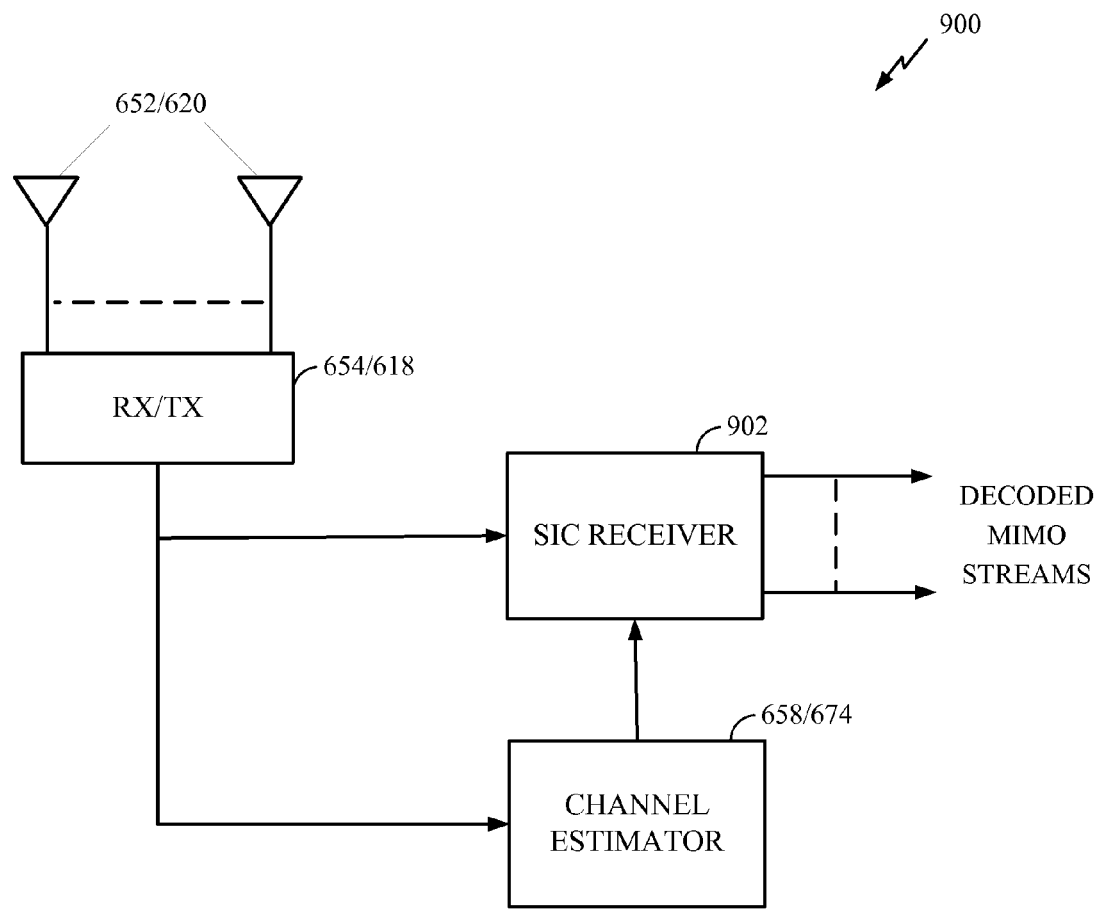
FIG. 9 illustrates a block diagram of a receiver for performing SIC ordering, in accordance with certain aspects of the present disclosure.

FIG. 9 illustrates a block diagram of a receiver 900 for performing SIC ordering, in accordance with certain aspects of the present disclosure.

In an aspect, the receiver 900 may either be UE 650 or eNB 610, as the SIC ordering approaches discussed above may be implemented by both UE 650 and eNB 610. The receiver 900 may include a transceiver 654/618 for receiving MIMO signals via antennas 652/620. The number of antennas employed by the receiver 900 is based on the order of the MIMO system. For example, the receiver 900 may include N antennas for an NXN MIMO system. Channel estimator 658/674 may determine channel quality for each of the streams/layers received by the transceiver 654/618 for use by the SIC receiver 902 in decoding the MIMO streams. For example, the channel estimator 658/674 may determine the measured SNR $\gamma^{meas}$ discussed above. The SIC receiver 902 is responsible to implement the SIC ordering approaches discussed above, including the SNR gap-based metric approach, the Rate gap-based metric approach, and the Speculative Single Code Block Based Ordering approach, to decode the received MIMO streams. The SIC receiver may include controller 659/675, RX processor 656/670, or a combination thereof.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

As used herein, a phrase referring to "at least one of" a list of items refers to any combination of those items, including single members. As an example, "at least one of: a, b, or c" is intended to cover: a, b, c, a-b, a-c, b-c, and a-b-c.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communication by a receiver, comprising:
   receiving at least two streams of data;
   selecting at least one of the received streams to decode first, from a comparison of a metric corresponding to at least two of the streams, the metric based on a gap between a measured value of a parameter and an allocated value of the parameter, wherein the parameter comprises a data rate; and
   performing interference cancelation using results of decoding the selected at least one stream to decode at least one non-selected stream.

2. The method of claim 1, further comprising:
   determining the metric for a stream of data using a measured value of the parameter and an allocated value of the parameter for the stream.

3. The method of claim 2, wherein the metric is averaged over multiple transmissions for the stream.

4. The method of claim 1, wherein selecting one of the received streams to decode first comprises:
   selecting a stream corresponding to the largest metric value.

5. The method of claim 1, wherein the allocated value of the parameter for a stream is determined using a number of symbols used for each transmission of the stream and a transport block size.

6. An apparatus for wireless communication, comprising:
   means for receiving at least two streams of data;
   means for selecting at least one of the received streams to decode first, from a comparison of a metric corresponding to at least two of the streams, the metric based on a gap between a measured value of a parameter and an allocated value of the parameter, wherein the parameter comprises a data rate; and
   means for performing interference cancelation using results of decoding the selected at least one stream to decode at least one non-selected stream.

7. The apparatus of claim 6, further comprising:
   means for determining the metric for a stream of data using a measured value of the parameter and an allocated value of the parameter for the stream.

8. The apparatus of claim 7, wherein the metric is averaged over multiple transmissions for the stream.

9. The apparatus of claim 6, wherein the means for selecting at least one of the received streams to decode first is configured to:
select a stream corresponding to the largest metric value.

10. The apparatus of claim 6, wherein the allocated value of the parameter for a stream is determined using a number of symbols used for each transmission of the stream and a transport block size.

11. An apparatus for wireless communication, comprising:
at least one processor configured to:
receive at least two streams of data;
select at least one of the received streams to decode first, from a comparison of a metric corresponding to at least two of the streams, the metric based on a gap between a measured value of a parameter and an allocated value of the parameter, wherein the parameter comprises a data rate; and
perform interference cancelation using results of decoding the selected at least one stream to decode at least one non-selected stream; and
a memory coupled to the at least one processor.

12. A computer program product for wireless communication, comprising:
A non-transitory computer readable medium having instructions stored thereon executed by a processor to perform a method comprising:
receiving at least two streams of data;
selecting at least one of the received streams to decode first, from a comparison of a metric corresponding to at least two of the streams, the metric based on a gap between a measured value of a parameter and an allocated value of the parameter, wherein the parameter comprises a data rate; and
performing interference cancelation using results of decoding the selected at least one stream to decode at least one non-selected stream.

\* \* \* \* \*